United States Patent
Liu et al.

(10) Patent No.: US 10,016,940 B2
(45) Date of Patent: Jul. 10, 2018

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Hua Liu, New Taipei (TW); Hong-Chuan Yeh, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 966 days.

(21) Appl. No.: 14/153,097

(22) Filed: Jan. 13, 2014

(65) Prior Publication Data
US 2015/0057780 A1     Feb. 26, 2015

Related U.S. Application Data

(60) Provisional application No. 61/869,079, filed on Aug. 23, 2013.

(30) Foreign Application Priority Data

Nov. 13, 2013   (TW) .............................. 102141307 A

(51) Int. Cl.
| | |
|---|---|
| *B29C 67/00* | (2017.01) |
| *B29C 64/386* | (2017.01) |
| *B33Y 30/00* | (2015.01) |

(52) U.S. Cl.
CPC ........ *B29C 67/0088* (2013.01); *B29C 64/386* (2017.08); *B33Y 30/00* (2014.12)

(58) Field of Classification Search
CPC .... B29C 67/0088; B29C 64/386; B33Y 30/00
(Continued)

(56) References Cited

U.S. PATENT DOCUMENTS 6,259,962 B1 *   7/2001   Gothait ............... B29C 67/0059
                                                700/118
6,970,290 B1 * 11/2005  Mashitani .......... H04N 13/0409
                                                348/54

(Continued)

*Primary Examiner* — Kenneth M Lo
*Assistant Examiner* — Sivalingam Sivanesan
(74) *Attorney, Agent, or Firm* — JCIPRNET

(57) ABSTRACT

A 3-D printing apparatus of the invention includes a process unit, a 3-D display unit, a base and a printing head. The processing unit is configured to read and process a digital 3-D model information. The base has a carrying surface. The 3-D display unit is coupled to and controlled by the processing unit and configured to display a digital 3-D image related to the digital 3-D model on the carrying surface for previewing, wherein the 3-D image is corresponding to a 3-D object related to the digital 3-D model. The printing head is disposed above the base and coupled to the processing unit, wherein the processing unit controls the printing head to dispense a base material formed on the carrying surface layer by layer so as to form the 3-D object according to the digital 3-D model information and following an image contour of the 3-D image.

11 Claims, 5 Drawing Sheets

(58) Field of Classification Search
USPC .......................................................... 700/98
See application file for complete search history.

(56) References Cited

U.S. PATENT DOCUMENTS

| | | | | |
|---|---|---|---|---|
| 2007/0188667 | A1* | 8/2007 | Schwerdtner | G02B 27/225 |
| | | | | 349/15 |
| 2012/0105903 | A1* | 5/2012 | Pettis | G06F 3/12 |
| | | | | 358/1.14 |
| 2013/0342660 | A1* | 12/2013 | Iwasaki | G02B 27/14 |
| | | | | 348/47 |
| 2014/0043630 | A1* | 2/2014 | Buser | H04N 13/02 |
| | | | | 358/1.13 |

* cited by examiner

THREE-DIMENSIONAL PRINTING APPARATUS

CROSS-REFERENCE TO RELATED APPLICATION

This application claims the priority benefits of U.S. provisional application Ser. No. 61/869,079, filed on Aug. 23, 2013 and Taiwan application serial no. 102141307, filed on Nov. 13, 2013. The entirety of each of the above-mentioned patent applications is hereby incorporated by reference herein and made a part of this specification.

BACKGROUND OF THE INVENTION

Field of the Invention

The present invention generally relates to a printing apparatus, and more particularly, to a three-dimensional (3-D) printing apparatus.

Description of Related Art

With advances of the computer-aided manufacturing (CAM), a brand new three-dimensional printing technology (3-D printing technology) has been developed in the manufacturing industry, which can very quickly fabricate a physical solid object based on an original concept design. The 3-D printing, in fact, is a general term of a series of rapid prototyping technologies (RP technologies) and the basic principle thereof is a laminate manufacturing, where an RP machine scans a prototype work piece along a plurality of X-Y planes to obtain a plurality of cross-section shapes of the work piece. Meanwhile, the probe intermittently displaces in Z coordinate with a step of a slice thickness layer by layer so as to ultimately form the 3-D object. The 3-D printing is unrestricted for the geometric shapes with the prototype, and the more complex the work piece is, the more excellences the RP technology shows so as to largely save the labor and the process time As a result, a digital 3-D model given by the computer-aided design (CAD) can be truthfully revealed under a shortest time requirement, and the model is, not only palpable, but also truly felt for its geometric curves. Once the user obtain the 3-D model, people can trial the assembling performance thereof, and even can do possible functional test thereof.

However, with the current 3-D printing apparatus for using the above-mentioned RP technique to form a 3-D object, after reading the digital 3-D model made by the computer software, the 3-D printing apparatus can directly perform 3-D printing tasks. Thus, if the fabricated 3-D object does not meet the requirement, the 3-D object must be discard, followed by re-modifying the digital 3-D model to print again. In short, the current 3-D printing apparatus is quite inconvenient with using and operation, even causes the material waste so as to potentially increase the cost of production.

SUMMARY OF THE INVENTION

Accordingly, the present invention is directed to a three-dimensional (3-D) printing apparatus able to perform a 3-D preview for the 3-D object to be printed so as to check the printing effect of the 3-D object in advance.

The 3-D printing apparatus of the invention includes a process unit, a 3-D display unit, a base and a printing head. The processing unit is configured to read and process a digital 3-D model information. The 3-D display unit is coupled to and controlled by the processing unit and configured to display a digital 3-D image related to the digital 3-D model information on the carrying surface for previewing, in which the 3-D image is corresponding to a 3-D object related to the digital 3-D model information. The base has a carrying surface. The printing head is disposed above the base and coupled to the processing unit, wherein the processing unit controls the printing head to dispense a base material along an image contour of the 3-D image on the carrying surface layer by layer so as to form the 3-D object according to the digital 3-D model information.

Based on the depiction above, the 3-D printing apparatus of the invention includes a process unit, a 3-D display unit, a base and a printing head, in which the processing unit is coupled to and controls the 3-D display unit and the printing head. Thus, the user can, after establishing a digital three-dimensional model information, use the processing unit to read and process the digital 3-D model information and enable the 3-D display unit displaying a 3-D image related to the digital 3-D model information, so that the user can preview the printing effect of the digital 3-D model information by viewing the 3-D image. After printing is confirmed by the user, the processing unit controls the printing head to dispense a base material on the base along an image contour of the 3-D image to form the 3-D object related to the digital 3-D model information according to the digital 3-D model information. In this way, the user can monitor the printing progress during a 3-D printing and the printing is performed only after the user previews and confirms the 3-D image, which can print a 3-D object meeting the user's expectation and requirement and avoid unnecessary waste of base material. In short, the invention can certainly advance the convenience of the 3-D printing apparatus in use and operation, reduce the waste of base material and further decrease the production cost.

In order to make the features and advantages of the present invention more comprehensible, the present invention is further described in detail in the following with reference to the embodiments and the accompanying drawings.

DESCRIPTION OF THE EMBODIMENTS

The above-mentioned or other relevant technical principles and the features and effects thereof are clearly presented together with the accompanying drawings in the following depicted embodiments. Note that some of expression words hereinafter regarding direction or orientation, such as 'up', 'down', 'front', 'behind', 'left', 'right', and the like, are to describe, not to limit, the present invention. In addition, in the following embodiments, a same notation or a similar notation is for marking the same or the similar portion.

Figure 1:
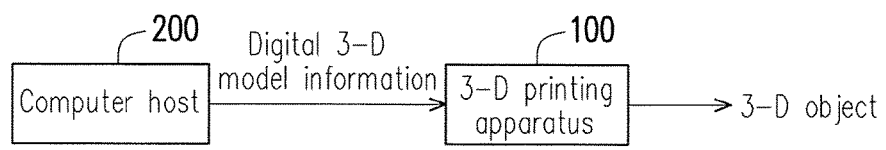
FIG. 1 is a schematic diagram showing the operation environment of a 3-D printing apparatus according to an embodiment of the present invention.
Figure 2:
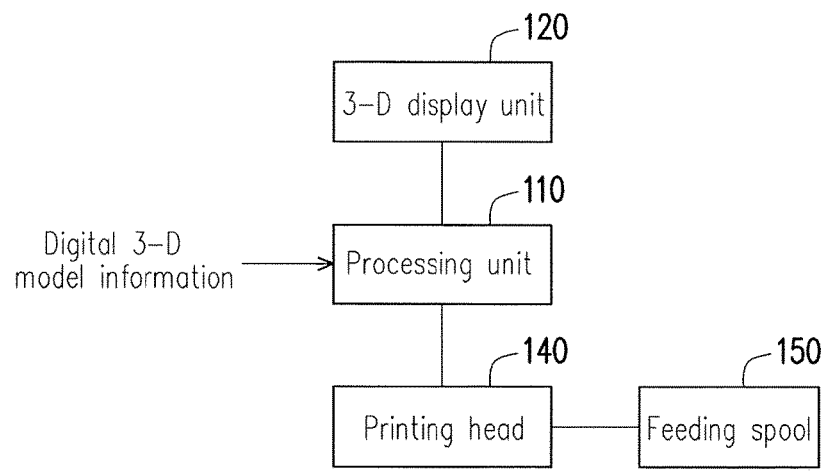
FIG. 2 is a partial block diagram of a 3-D printing apparatus according to an embodiment of the present invention.

FIG. 1 is a schematic diagram showing the operation environment of a 3-D printing apparatus according to an embodiment of the present invention and FIG. 2 is a partial block diagram of a 3-D printing apparatus according to an embodiment of the present invention. Referring to FIGS. 1 and 2, a 3-D printing apparatus 100 of the embodiment is suitable for fabricating a 3-D object according to a digital 3-D model information. The digital 3-D model information can be a digital 3-D image file created by a computer host 200 through computer-aided design (CAD) or animation modelling software. The digital 3-D model information is used for the 3-D printing apparatus 100 to read and fabricate a 3-D object according to the digital 3-D model information.

Figure 3:
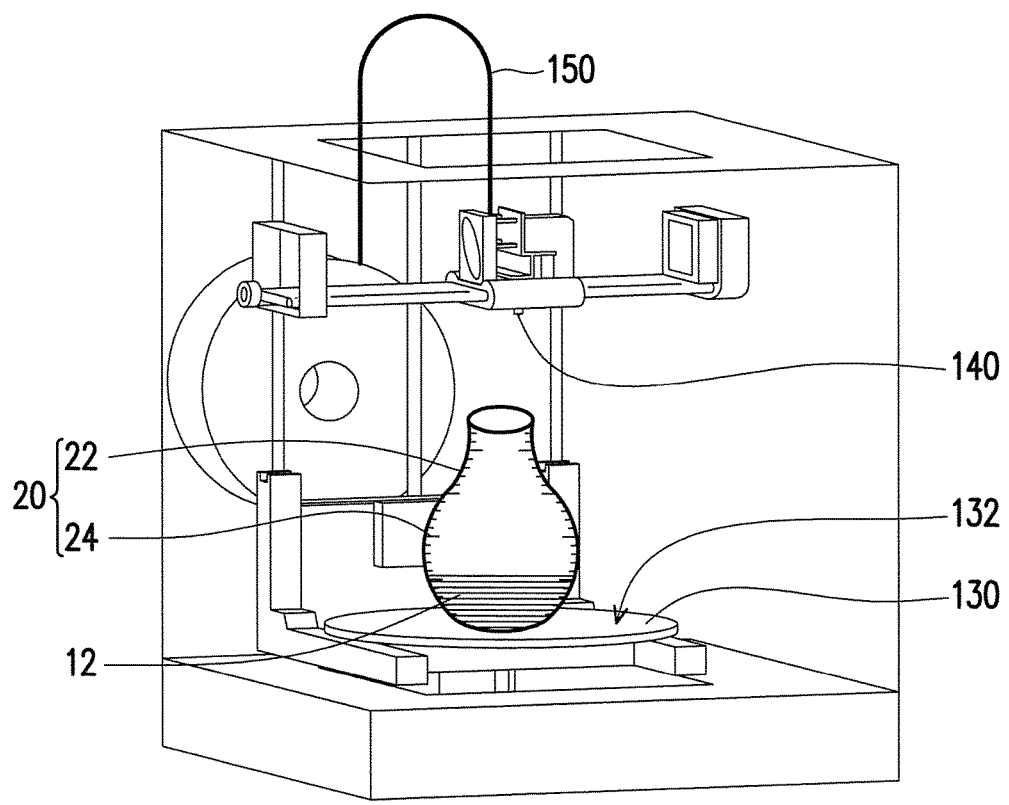
FIG. 3 is a schematic diagram of the partial parts of a 3-D printing apparatus according to an embodiment of the present invention.

FIG. 3 is a schematic diagram of the partial parts of a 3-D printing apparatus according to an embodiment of the present invention. Referring to FIGS. 1-3, the 3-D printing apparatus 100 includes a process unit 110, a 3-D display unit 120, a base 130 and a printing head 140. In the embodiment, the processing unit 110 is for reading and processing the digital 3-D model information and is respectively coupled to and controls the 3-D display unit 120 and the printing head 140. The base 130 has a carrying surface 132 for carrying a base material 12 dispensed by the printing head 140. The printing head 140 is disposed above the base 130 and controlled by the processing unit 110 to dispense the base material 12 on the carrying surface 132 layer by layer to form a plurality of base material layers. The base material layers are stacked as shown by FIG. 3 to form a 3-D object related to the digital 3-D model information. In the embodiment, the base material 12 printed layer by layer by the printing head 140 and formed on the carrying surface 132 includes a building material, a support material for supporting the building material and a release material formed between the building material and the support material. Specifically, in addition to the building material for forming the 3-D object 10, the base material 12 formed on the carrying surface 132 also includes the supporting material for supporting the 3-D object and the release material formed between the building material and the supporting material. After the base material 12 printed and formed on the carrying surface 132 is cured, the supporting material and the release material are removed to obtain the 3-D object.

In addition, in the embodiment, the 3-D printing apparatus 100 further includes at least one feeding spool 150, which is a solid spool composed of thermofussion base material 12. By using, for example, a heating unit disposed at the printing head 140 to heat the solid spool, the base material 12 is in a melting state. Then, the thermofussion base material 12 is squeezed out via the printing head 140 to be stacked on the carrying surface 132 layer by layer so as to form a plurality base material layers. Thereafter, a hardening and curing process is performed to form the 3-D object. In other embodiments of the invention, the feeding spool 150 can be a pipe to carry and feed a liquid or gel base material 12 to the printing head 140, such that the liquid or gel base material 12 is dispensed via the printing head 140 onto the carrying surface 132. Finally, for example, a hardening and curing process is performed on the base material 12 to form the 3-D object.

In the embodiment, while the printing head 140 dispenses the base material 12 formed on the carrying surface 132, the printing head 140 may move along, for example, the directions parallel to the carrying surface 132, and the base 130 may move along, for example, the directions parallel to the carrying surface 132, move or rotate along the normal direction of the carrying surface 132. The processing unit 110 is coupled to the printing head 140 and the base 130 to control the moving of the processing unit 110 and the printing head 140 according to the digital 3-D model information and further to obtain the fabricated shape of the 3-D object 10. However, anyone skilled in the art should understand that the embodiment is described in examples, and in fact, the invention does not limit the moving directions of the base 130 and the printing head 140.

The base 130 has a carrying surface 132. The processing unit 110 is respectively coupled to and controls the 3-D display unit 120 and the printing head 140. After reading the digital 3-D model information, the processing unit 110 controls the 3-D display unit 120 to display a 3-D image 20 on the carrying surface 132 related to the digital 3-D model information as shown by FIG. 3. In the embodiment, the 3-D image 20 is displayed at a predetermined position on the carrying surface 132 where the 3-D object would be formed, so that the user can preview the printing effect of the digital 3-D model vividly. After the user previews and confirms the 3-D image 20, the processing unit 110 controls the printing head 140 to dispense the base material 12 by layers on the carrying surface 132 along an image contour 22 of the 3-D image 20 according to the digital 3-D model information so as to form a plurality of stacked base material layers and the 3-D object related to the digital 3-D model information. As a result, an image contour of the 3-D object is substantially coincided with the image contour 22 of the 3-D image 20 so that the user can monitor the printing progress during the printing.

In more details, the 3-D display unit 120 displays the 3-D image 20 related to the digital 3-D model information while the printing head 140 dispenses the base material 12 layer by layer onto the carrying surface 132 according to the digital 3-D model information. Therefore, the forming range of the base material 12 on the carrying surface 132 substantially falls in the range enclosed by the image contour 22 of the 3-D image 20, and the formed materials are stacked along the image contour 22 of the 3-D image 20 to form the 3-D object related to the digital 3-D model information. In other words, firstly, the 3-D display unit 120 displays the 3-D image 20 of the 3-D object to be printed on the carrying surface 132 for the user to preview the printing effect of the 3-D object. In addition, the 3-D image 20 keeps displayed during the printing process; meanwhile, the printing head 140 is controlled to form the 3-D object related to the digital 3-D model information by means of continuously dispensing the base material 12 layer by layer onto the carrying surface 132 along the image contour 22 of the 3-D image 20, so that the user can monitor the printing progress of the 3-D object. In the embodiment, the 3-D image 20 can further include a plurality of visual indications 24 related to the digital 3-D model information, and the visual indications 24 are, for example, a series of scale indications to display the printing progress as shown by FIG. 3 so as to allow the user knowing of the printing progress.

Figure 4:
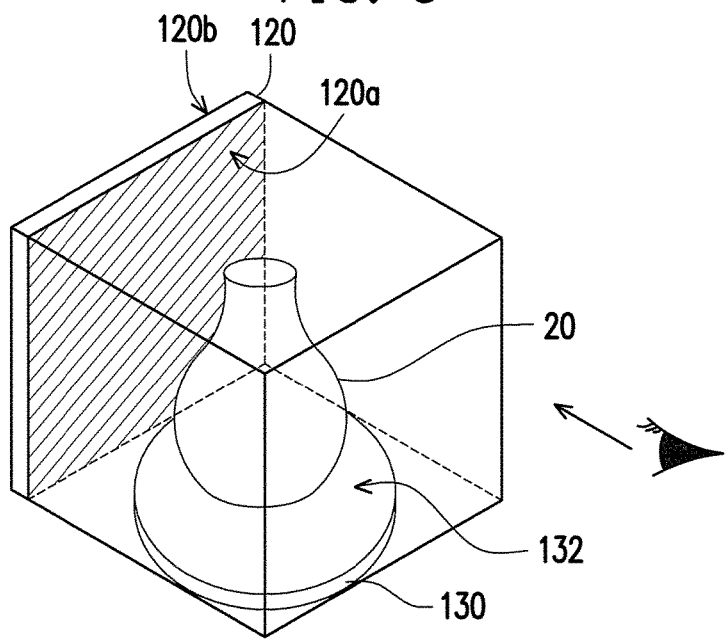
FIG. 4 is a using situation diagram of a 3-D printing apparatus according to an embodiment of the present invention.

FIG. 4 is a using situation diagram of a 3-D printing apparatus according to an embodiment of the present invention. Referring to FIG. 4, the 3-D display unit 120 under the controlling of the processing unit 110 adopts, for example, a naked-eye stereo display approach to display a 3-D image 20 related to the digital 3-D model information for printing previewing, wherein the 3-D image 20 is corresponding to the 3-D object related to the digital 3-D model information. In the embodiment, after the 3-D image 20 displayed by the 3-D display unit 120 is previewed and confirmed, the 3-D display unit 120 under the control of the processing unit 110 dispenses the base material 12 layer by layer onto the carrying surface 132. Specifically, after the user designs and builds the digital 3-D model, the processing unit 110 would read and process the digital 3-D model information and control the 3-D display unit 120 to display the 3-D image 20 related to the digital 3-D model information so as to allow the user pre-checks (previews) the printing effect of the digital 3-D model in advance. After the user confirms the preview and the printing task (for example, the computer host 200 sends out a printing order to the 3-D printing apparatus 100), the printing head 140 under the controlling of the processing unit 110 dispenses the base material 12 on the carrying surface 132 to form the 3-D object 10, and thereby avoid unnecessary wasting of the base material 12.

In addition, in the embodiment, the 3-D image 20 can be displayed, as shown in FIG. 4, at a predetermined position of the carrying surface 132 where the 3-D object is determined to be formed so as to allow the user previewing the printing effect of the digital 3-D model information vividly. Specifically, after the processing unit 110 reads the digital 3-D model information, for example, a space information of the digital 3-D model is converted into X-Y-Z coordinates corresponding to the carrying surface 132, and a predetermined position of the carrying surface 132 predetermined to form the 3-D object 10 thereon is set. Then, the 3-D display unit 120 is controlled to display the 3-D image 20 of the digital 3-D model at the predetermined position to allow the user more truly feel the printing effect of the digital 3-D model information on the carrying surface 132. After the user previews and confirms the 3-D image 20, the processing unit 110 controls the printing head 140 to dispense the base material 12 layer by layer on the carrying surface 132 according to the digital 3-D model information along the image contour 22 of the 3-D image 20 so as to form the 3-D object related to the digital 3-D model information for the user to monitor the printing progress during printing.

In other words, the 3-D display unit 120 displays the 3-D image 20 of the 3-D object to be printed on the carrying surface 132 in advance for the user to preview the printing effect of the 3-D object, and the 3-D display unit 120 continuously displays the 3-D image 20 during printing and controls the printing head 140 to dispense the base material 12 layer by layer on the carrying surface 132 along the image contour 22 of the 3-D image 20 to form the 3-D object related to the digital 3-D model information, which allows the user knowing of the printing progress of the 3-D object. In addition, in the embodiment, the 3-D image 20 further includes a plurality of visual indications 24 related to the digital 3-D model information, and the visual indications 24 are, for example, a series of scale marks to display the printing progress as shown by FIG. 3 so as to allow the user knowing of the printing progress.

Figure 5:
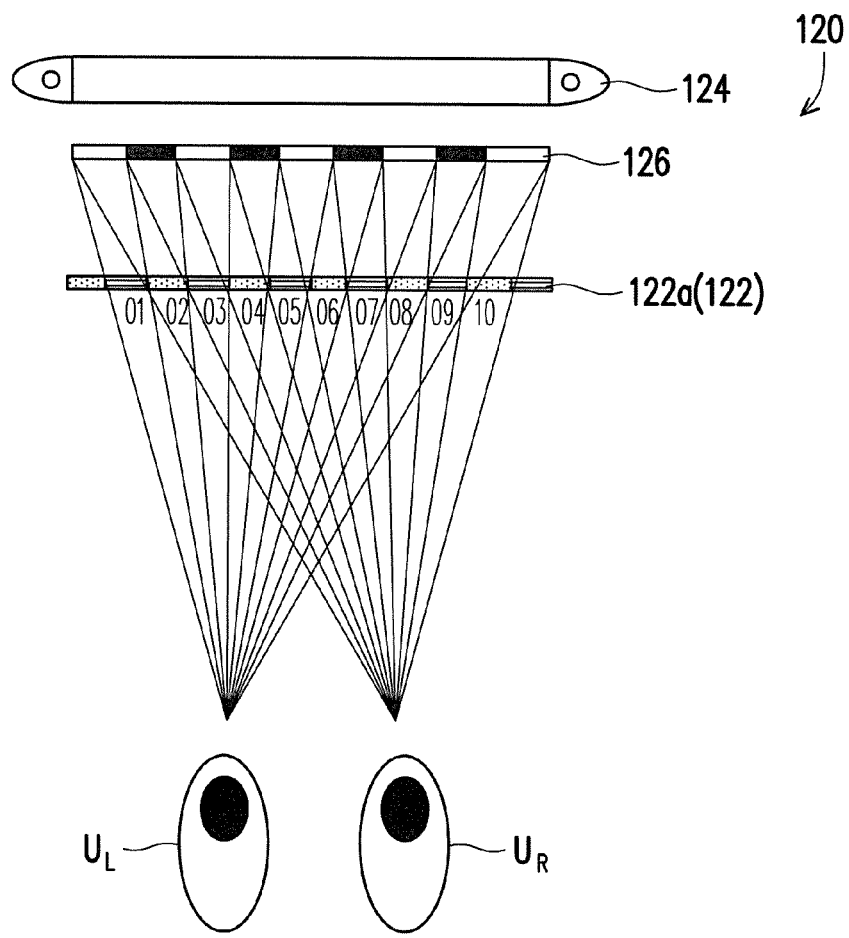
FIG. 5 is a schematic diagram of a 3-D display unit according to an embodiment of the present invention.

FIG. 5 is a schematic diagram of a 3-D display unit according to an embodiment of the present invention. Referring to FIG. 5, in the embodiment, the 3-D display unit 120 has a front side 120a and a rear side 120b opposite to the front side 120a. The user is suitable to face the front side 120a for viewing the 3-D image 20 as shown by FIG. 4. The 3-D display unit 120 includes, for example, a display panel 122, a light source module 124 and a parallax barrier module 126. The display panel 122 has a pixel matrix 122a. It should be noted that for simplicity, in FIG. 5, only the pixel matrix 122a of the display panel 122 is given, but the other components of the display panel 122 are omitted so as to more clearly display the relationship between the pixel matrix 122a and the parallax barrier module 126. In the embodiment, the parallax barrier module 126 is located between the display panel 122 and the light source module 124 as shown by FIG. 5. In addition, the display panel 122 is located at the front side 120a, while the light source module 124 is located at the rear side 120b. The light source module 124 is, for example, a backlight module for providing a light source. The parallax barrier module 126 is disposed on a light transmission path of the light source provided by the light source module 124.

Usually, the parallax barrier module 126 can have a plurality of vertical transparent stripes and opaque stripes arranged alternately so as to make the light emits in alternate manner in association with the pixel matrix 122a of the display panel 122 according to the eye position of the user, such that the right-eye $U_R$ of the user can see a first frame image, while the left-eye $U_L$ of the user can see a second frame image. By means of the stereo display approach for separating the images of the left/right eyes, the user can see the 3-D image, i.e., the stereo image. For example, as shown by FIG. 5, the left eye of the user is limited to see odd-column pixels 01, 03, 05, 07 and 09, while the even-column pixels 02, 04, 06, 08 and 10 are invisible. At the same time, the right eye of the user is limited to see the odd-column pixels 01, 03, 05, 07 and 09, while the odd-column pixels 01, 03, 05, 07 and 09 are invisible. In this way, the left-eye $U_L$ and the right-eye $U_R$ of the user can respectively see the corresponding image of the display frame so as to build a stereo image in the vision system thereof. That is, the 3-D image seen by the user is a spatial-multiplexed result, by which dividing the display image into left-eye display image and right-eye display image alternately enables the user see a stereo image, i.e., the 3-D image 20.

Figure 6:
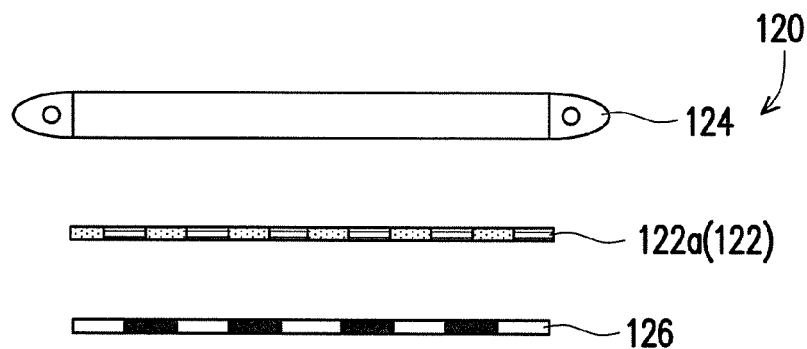
FIG. 6 is a schematic diagram of a 3-D display unit according to another embodiment of the present invention.

FIG. 6 is a schematic diagram of a 3-D display unit according to another embodiment of the present invention. Referring to FIG. 6, the embodiment is similar to the embodiment of FIG. 5, and a same notation or a similar notation is for marking the same or the similar portion. In following, only unique points of the embodiment from the previous one are depicted. A 3-D display unit 120 of the embodiment may include a display panel 122, a light source module 124 and a parallax barrier module 126. The display panel 122 has a pixel matrix 122a. The difference between the 3-D display unit 120 in the embodiment and the structure of FIG. 5 rests in that the relative positions of the parallax barrier module 126 and the display panel 122 of the embodiment are opposite to the ones in FIG. 5. In other words, in FIG. 5, the parallax barrier module 126 is disposed between the display panel 122 and the light source module 124, while in the 3-D display unit 120 of FIG. 6, the display panel 122 is disposed between the parallax barrier module 126 and the light source module 124, the parallax barrier module 126 is located at the front side 120a of the 3-D display unit 120, and the light source module 124 is located at the rear side 120b of the 3-D display unit 120. In this way, the parallax barrier module 126 also enables the beams from the light source module 124 emits in alternate manner through the alternating vertical stripes thereof in association with the pixel matrix 122a of the display panel 122 according to the eye position of the user, the right-eye $U_R$ and the left-eye $U_L$ of the user can respectively see different images. Thus, by using the stereo display approach of separated the left/right eyes images, the user can see 3-D image.

Figure 7:
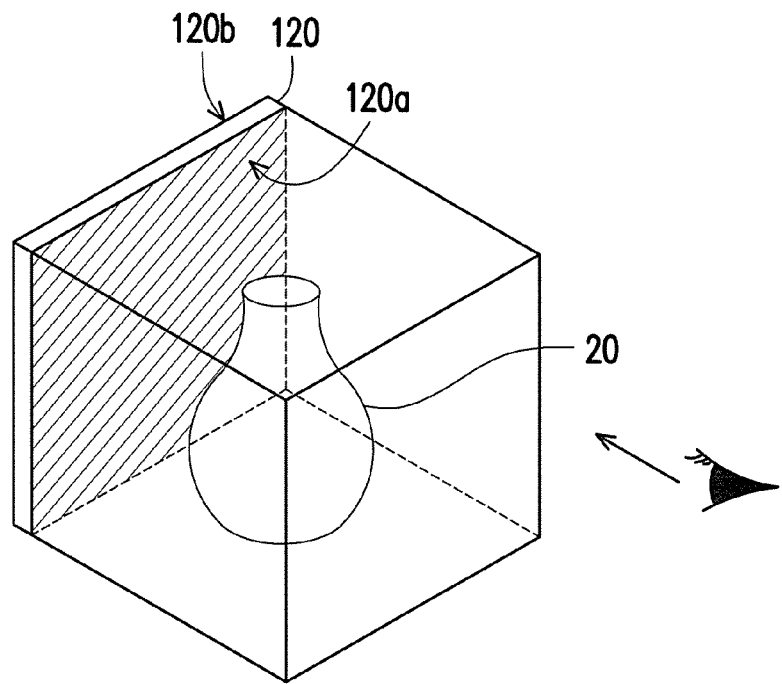
FIG. 7 is a using situation diagram of a 3-D display unit according to an embodiment of the present invention.

FIG. 7 is a using situation diagram of a 3-D display unit according to an embodiment of the present invention. Referring to FIG. 7, in the embodiment, the 3-D display unit 120 has a front side 120a and a rear side 120b opposite to each other. The user is suitable for facing the front side 120a to view the 3-D image 20. The 3-D image 20 of the embodiment is displayed between the user and the front side 120a. In the 3-D display unit 120 of the embodiment, the parallax barrier module 126 can be disposed, as the structure shown by FIG. 5 or 6, between the display panel 122 and the light source module 124 or between the display panel 122 and the user. In addition, anyone skilled in the art should understand that the embodiment does not limit the structure layout of the 3-D display unit 120. In fact, once the 3-D image 20 is displayed between the user and the front side 120a, the layout falls in the protection scope of the invention.

Figure 8:
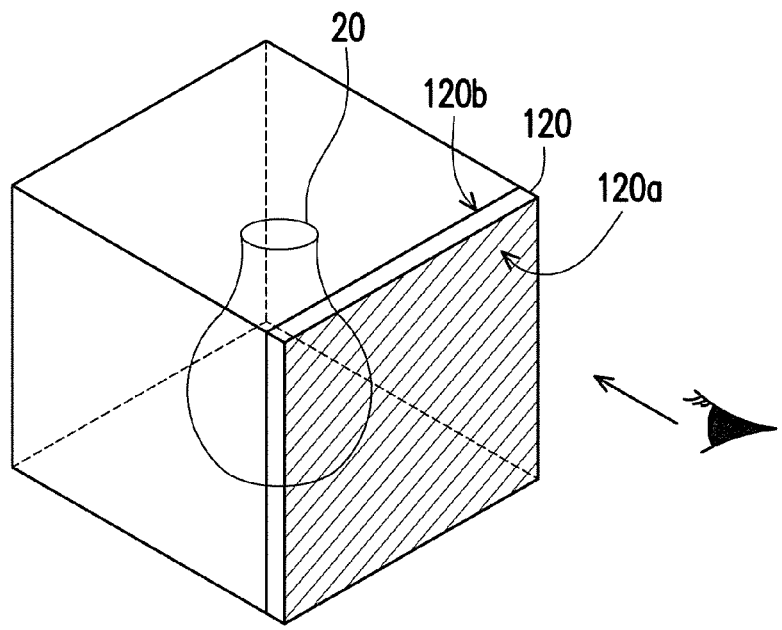
FIG. 8 is a using situation diagram of a 3-D display unit according to another embodiment of the present invention.

FIG. 8 is a using situation diagram of a 3-D display unit according to another embodiment of the present invention. Referring to FIG. 8, a 3-D display unit 120 (transparent one) has a front side 120a and a rear side 120b opposite to each other. The user is suitable to face the front side 120a for viewing the 3-D image 20. However, the 3-D display unit 120 of the embodiment is located between the user and the 3-D image 20, that is, the 3-D image 20 of the embodiment is imaged in back of the 3-D display unit 120. In the 3-D display unit 120 of the embodiment, the parallax barrier module 126 can be disposed, also as the structure shown by FIG. 5 or 6, between the display panel 122 and the light source module 124 or between the display panel 122 and the user. In addition, the embodiment does not limit the structure layout of the 3-D display unit 120. In fact, once the 3-D image 20 is displayed in the back of the 3-D display unit 120, the layout falls in the protection scope of the invention. It should be noted that the structures of the 3-D display unit 120 in FIGS. 7 and 8 can be the same, and the images for the left and right eyes respectively provided by the pixel matrix 122a are switched so as to control the 3-D image 20 located in the front or the back of the 3-D display unit 120.

With the above-described layout, the 3-D display unit 120 is disposed in the front of the base 130 so that the rear side 120b of the 3-D display unit 120 faces the base 130 to make the 3-D image 20 displayed at the predetermined position on the carrying surface 132 where the 3-D object is planned to be formed. Thus, the user can preview the printing effect of the digital 3-D model more vividly. After the 3-D image 20 is previewed and confirmed, the processing unit 110 controls the printing head 140 to dispense the base material 12 layer by layer on the carrying surface 132 according to the digital 3-D model information along an image contour 22 of the 3-D image 20 so as to form a 3-D object related to the digital 3-D model information, so that the user can monitor the printing progress of the 3-D object. In other words, the 3-D display unit 120 displays the 3-D image 20 of the 3-D object to be printed on the carrying surface 132 in advance, and the 3-D display unit 120 continuously displays the 3-D image 20 during printing and controls the printing head 140 to dispense the base material 12 layer by layer on the carrying surface 132 along the image contour 22 of the 3-D image 20 to form the 3-D object related to the digital 3-D model information, which allows the user knowing of the printing progress of the 3-D object.

Figure 9:
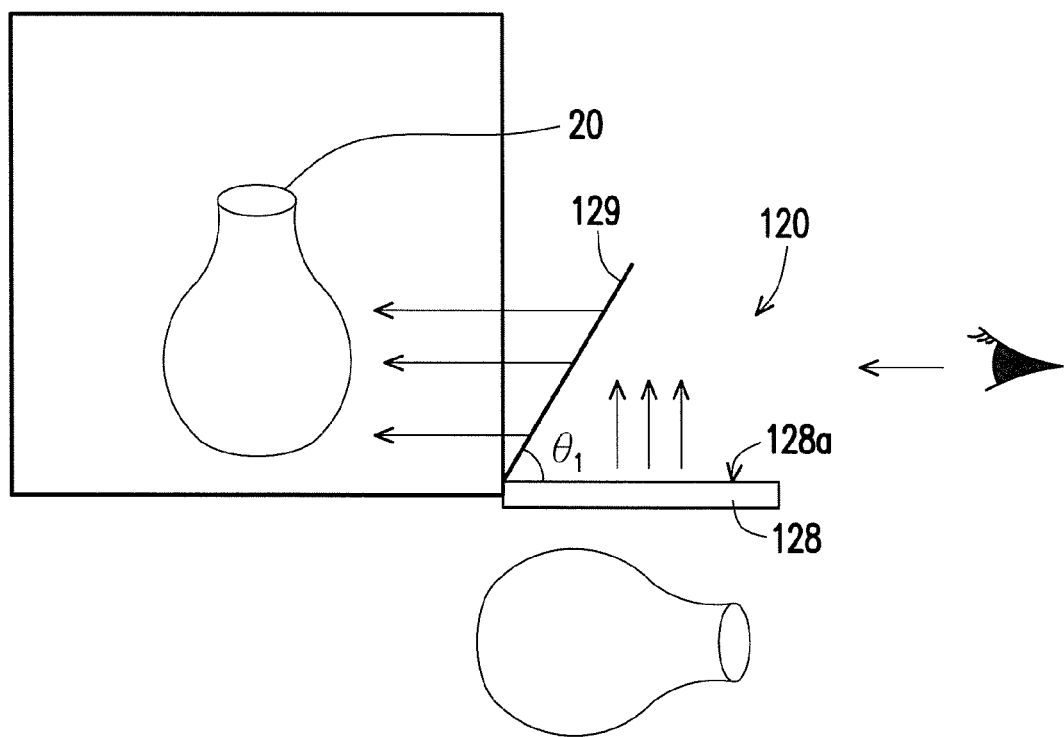
FIG. 9 is a using situation diagram of a 3-D display unit according to yet an embodiment of the present invention.

FIG. 9 is a using situation diagram of a 3-D display unit according to yet an embodiment of the present invention. In an embodiment of the invention, the above-described 3-D display unit 120 includes an image display module 128 and a reflective component 129. The image display module 128 is for providing an image beam. In the embodiment, the image display module 128 includes a display panel 122, a light source module 124 and a parallax barrier module 126 as depiction above. The parallax barrier module 126 makes the light beams provided by the light source module 124 emits in alternate manner, followed by providing the image beam via pixel matrix 122a of the display panel 122. The reflective component 129 is disposed on a transmission path of the image beam. Specifically, the image display module 128 has an exiting surface 128a. The image display module 128 emits the image beam via the exiting surface 128a, in which an acute angle $\theta_1$ is included between the exiting surface 128a and the reflective component 129 as shown by FIG. 9. In the embodiment, the angle $\theta_1$ is substantially equal to 45°. With the layout, the image beam forms the 3-D image 20 via the reflective component 129, which enables the user to view the 3-D image 20 through the reflective component 129.

In summary, the 3-D printing apparatus of the invention utilizing the processing unit thereof to be coupled to and control the 3-D display unit and the printing head. Thereby, after a digital 3-D model is built by a user, the processing unit reads and processes the digital 3-D model information and controls the 3-D display unit to display a 3-D image related to the digital 3-D model information, so that the user can preview the printing effect of the digital 3-D model in advance through viewing the 3-D image which avoids unnecessary waste of the base material. In addition, the 3-D image is displayed at a predetermined position of the base where the 3-D image is planned to be formed, so that the user can preview the printing effect of the digital 3-D model information more vividly. After the 3-D image is previewed and confirmed, the processing unit controls the printing head to dispense the base material layer by layer on the carrying surface according to the digital 3-D model information along an image contour of the 3-D image so as to form a 3-D object related to the digital 3-D model information. Thus, the user can monitor the printing progress during the 3-D printing. Since the printing is performed only after the 3-D image contour is previewed and confirmed by the user, the 3-D object can meet the expectation and requirement of the user so as to avoid the unnecessary waste of the base material. In short, the invention certainly can advance the using and operation convenience of the 3-D printing apparatus, reduce the unnecessary waste of the base material and further reduce the production cost.

The above described are preferred embodiments of the present invention only, which do not limit the implementation scope of the present invention. It will be apparent to those skilled in the art that various modifications and equivalent variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A three-dimensional printing apparatus, comprising:
   a processing unit, configured to read and process a digital three-dimensional model information;
   a base, having a carrying surface;
   a three-dimensional display unit, coupled to and controlled by the processing unit and configured to display a digital three-dimensional image related to the digital three-dimensional model information on the carrying surface for previewing, wherein the three-dimensional image is corresponding to a three-dimensional object related to the digital three-dimensional model information; and a printing head, disposed above the base and coupled to the processing unit, wherein the processing unit controls the printing head to dispense a base material on the carrying surface layer by layer along an image contour of the three-dimensional image so as to form the three-dimensional object according to the digital three-dimensional model information, wherein an object contour of the three-dimensional object and the image contour substantially appear to be layer by layer coincided with each other in a space above the carrying surface at where the three-dimensional object is formed.

2. The three-dimensional printing apparatus as claimed in claim 1, wherein the image contour comprises a plurality of visual indications related to the digital three-dimensional model information.

3. The three-dimensional printing apparatus as claimed in claim 2, wherein the visual indications comprise a plurality of printing progress scales.

4. The three-dimensional printing apparatus as claimed in claim 1, wherein the three-dimensional image is displayed on a predetermined position of the carrying surface of the base and the predetermined position is preset for the three-dimensional object to be formed by the printing head.

5. The three-dimensional printing apparatus as claimed in claim 1, wherein the three-dimensional display unit has a front side and a rear side opposite to the front side, a user is suitable for facing the front side to view the three-dimensional image, and the three-dimensional image is located between the user and the front side.

6. The three-dimensional printing apparatus as claimed in claim 1, wherein the three-dimensional display unit has a front side and a rear side opposite to the front side, a user is suitable for facing the front side to view the three-dimensional image, and the three-dimensional display unit is located between the user and the three-dimensional image.

7. The three-dimensional printing apparatus as claimed in claim 1, wherein the three-dimensional display unit comprises an image display module and a reflective component, the image display module is configured to provide an image beam, the reflective component is disposed on a transmission path of the image beam, and the image beam forms the three-dimensional image via the reflective component.

8. The three-dimensional printing apparatus as claimed in claim 7, wherein the image display module has a light exiting surface, the image display module emits the image beam via the light exiting surface, and an acute angle is included between the light exiting surface and the reflective component.

9. The three-dimensional printing apparatus as claimed in claim 8, wherein the acute angle is substantially equal to 45°.

10. The three-dimensional printing apparatus as claimed in claim 1, wherein the three-dimensional display unit has a front side and a rear side opposite to the front side, the three-dimensional display unit comprises a display panel, a light source module and a parallax barrier module, the display panel is located between the parallax barrier module and the light source module, and the parallax barrier module is located at the front side and the light source module is located at the rear side.

11. The three-dimensional printing apparatus as claimed in claim 1, wherein the three-dimensional display unit has a front side and a rear side opposite to the front side, the three-dimensional display unit comprises a display panel, a light source module and a parallax barrier module, the parallax barrier module is located between the light source module and the display panel, and the display panel is located at the front side and the light source module is located at the rear side.

* * * * *